United States Patent
Boulineau (10) Patent No.: US 11,387,655 B2
(45) Date of Patent: Jul. 12, 2022

(54) BATTERY ENERGY STORAGE SYSTEM (71) Applicant: Open Energi Limited, London (GB)

(72) Inventor: Remi Boulineau, London (GB)

(73) Assignee: OPEN ENERGI LIMITED, London (GB)

( * ) Notice: Subject to any disclaimer, the term of this patent is extended or adjusted under 35 U.S.C. 154(b) by 0 days.

(21) Appl. No.: 17/270,084

(22) PCT Filed: Aug. 23, 2019

(86) PCT No.: PCT/GB2019/052369
§ 371 (c)(1),
(2) Date: Feb. 22, 2021

(87) PCT Pub. No.: WO2020/039204
PCT Pub. Date: Feb. 27, 2020

(65) Prior Publication Data
US 2021/0328432 A1  Oct. 21, 2021

(30) Foreign Application Priority Data
Aug. 24, 2018  (GB) ...................... 1813875

(51) Int. Cl.
*H02J 3/32* (2006.01)
*H02J 7/00* (2006.01)
*H02J 3/38* (2006.01)

(52) U.S. Cl.
CPC ............... *H02J 3/32* (2013.01); *H02J 3/381* (2013.01); *H02J 7/0048* (2020.01); *H02J 7/0071* (2020.01)

(58) Field of Classification Search
CPC .......... H02J 3/32; H02J 7/0048; H02J 7/0071; H02J 3/381; H02J 7/00; H02J 3/38
See application file for complete search history.

(56) References Cited

U.S. PATENT DOCUMENTS

| | | | |
|---|---|---|---|
| 9,812,866 B2 | 11/2017 | Hunt et al. | |
| 2008/0224541 A1* | 9/2008 | Fukuhara | H02J 3/386 320/101 |

(Continued)

FOREIGN PATENT DOCUMENTS

GB  2540251 A  1/2017

*Primary Examiner* — Robert L Deberadinis
(74) *Attorney, Agent, or Firm* — Carmody Torrance Sandak & Hennessey LLP (57) ABSTRACT

A battery energy storage system for use in providing balancing services to an electrical power distribution network is set to monitor the state of charge (SoC) of a storage battery (26). If the SoC is within an optimal range (48), the balancing service is provided solely by charging and discharging the battery. If the battery SoC falls below a predetermined low threshold (52), a first non-battery asset is operated to increase power supplied to the network. Similarly, if the battery SoC rises above a predetermined high threshold (50), a second non-battery asset is operated to provide the balancing service. With this arrangement, requirements on the energy storage capacity of the battery are reduced. For the system to meet balancing service regulatory requirements, the battery need only remain capable of charging or discharging beyond each threshold (50, 52) for a period of time that covers that taken for the respective asset to reach operational capacity.

22 Claims, 5 Drawing Sheets (56) References Cited

U.S. PATENT DOCUMENTS

2012/0323389 A1 12/2012 Shelton et al.
2016/0099568 A1 4/2016 Gersch et al.
2017/0298890 A1 10/2017 King

* cited by examiner

BATTERY ENERGY STORAGE SYSTEM

This invention relates to electrical power distribution networks, a large-scale example of which is managed in England and Wales by the National Grid. In particular, the invention is concerned with a battery system arranged to store charge that is used in balancing electricity supply with demand.

In any electrical power distribution network, it is important to balance the power supplied to the network with that drawn from it. Any imbalance, even on a short term, can result in problems ranging from a drop in efficiency of power transmission, unpredictable fluctuations in electricity supply to more severe effects such as power blackouts.

In the UK, the supply is largely from electricity generated by power stations. Each station notifies the Grid of the amount of electricity it will be feeding into the network and the Grid provides a forecast of the expected demand for power. The balance of supply and demand is achieved, in this first instance, by a request from the Grid for more or less generation from power stations in order to match the forecast demand.

The modern electricity network is balanced on a second by second basis with far more sophistication than suggested by this basic model. Any imbalance between power generation and power consumption by loads on the network is manifest in a deviation of an operational characteristic of the electricity supply from its set, intended, value. Monitoring such a parameter enables imbalances to be detected and therefore corrected. Most commonly, it is the frequency of electricity supplied by the Grid that is monitored for this purpose. In the UK, mains electricity is supplied at 50 Hz. If the aggregated loads on the network draw more power than supplied, the frequency will drop. Broadly speaking, this effect can be understood as increasing load on a generator causes the generator to run (rotate) slower. Conversely, if an imbalance is caused by over-generation, the frequency will rise above its nominal 50 Hz value.

There are numerous factors that may cause an imbalance in a power network. They may be supply-side, for example technical problems at a generator, or demand-side, for example a surge in demand during a televised sporting event. Similarly, corrections may be applied by adjusting power generated or consumed. To correct on the supply side, the network generally has available to it a backup system of assets (generators) that can come online or disconnect from the grid on request. On the demand side, the network will additionally have a mechanism by which at least a selection of loads on the network can be operated at different power levels. Response may be dynamic, operating in response to the second by second changes in operating frequency or non-dynamic, which is usually a discrete service triggered in response to a pre-defined frequency deviation. In the UK, providers of balancing services to the Grid network monitor frequency deviations themselves. In other jurisdictions, the network operator carries out its own monitoring and will communicate signals to providers that indicate the balancing service required.

With the shift from 100% coal-powered electricity generation to renewable forms of energy, the task of maintaining a predictable level of supply is made more difficult. Whilst a power station would generally only go offline in the relatively unlikely event of a breakdown, renewable sources are fundamentally less reliable. Wind farms are less productive if the wind is low; they must also shut down in the event of particularly high winds; solar energy generation is reduced in the event of cloud and hydro-electric generation is also reliant on the weather. The level of supply is, like demand, therefore becoming more difficult to predict. This has prompted an increased requirement for balancing provided by the demand side of the distribution network. Overall, there is a need for a flexible balancing system that is rapidly responsive to imbalances.

On a practical level therefore, a grid network must incorporate a range of mechanisms for power adjustment. Mandatory Frequency Response is required for all generators connected to the grid system and sets the criteria for the timescales in which a power adjustment must be made and its minimum duration. Frequency Control by Demand Management (FCDM) is the provision of a network of loads that can be shut down for a set maximum duration in order to manage large deviations in frequency that may occur, for example, with the loss of a significant generator. Firm Frequency Response (FFR) sets criteria in terms of response energy: such assets/loads must operate dynamic and non-dynamic responses and deliver a minimum of 1 MW response energy. FFR may be provided, amongst other implementations, by responsive loads that can be operated for short periods at reduced power, without noticeable drop in performance. Aggregated responses, usually in sub-groups of the available responsive loads, contribute to balancing supply and demand. Sub-groups are selected such that reduced power is demanded from individual loads only for a limited period of time. There has more recently been a move to establishing a grid capability for Enhanced Frequency Response (EFR). This is a service that can provide a full power adjustment at 1 second (or less) of registering a frequency deviation. This is in contrast with existing response providers in which assets are required to come online within 10 or 30 seconds of detecting a frequency deviation. Generally, EFR is provided by assets that store energy ready for supply to the grid, rather than those that have to be switched on to provide additional power.

Figure 1:
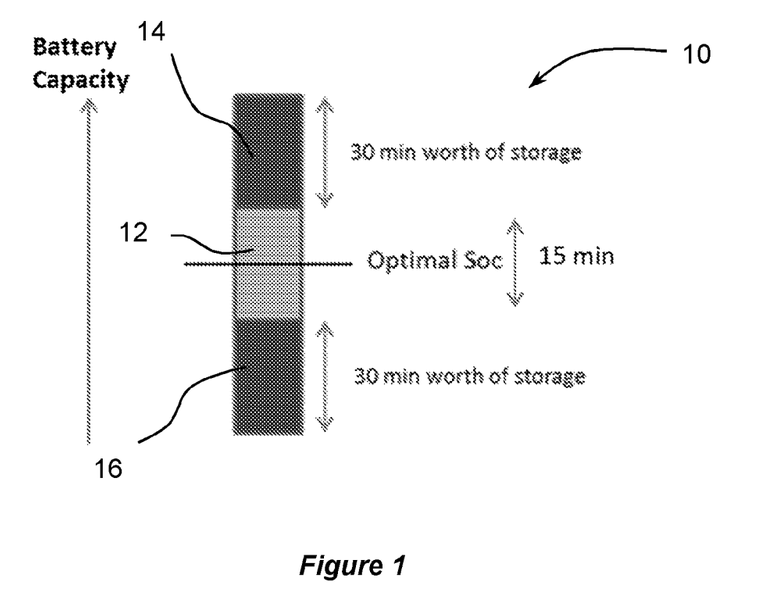
FIG. 1 is a representation of battery capacity necessary for and used in providing frequency response to a power grid network.

A battery is, on the face of it, attractive to incorporate in FFR and EFR capabilities. It can store electrical energy that can be rapidly provided in response to frequency deviations of grid supply. US 2016/0099568 describes just such an application of energy storage devices, such as a battery. However meeting the requirements of the National Grid in other respects is not so straightforward. In addition to the energy storage required, FFR activities in the UK require a battery to have 30 minutes' worth of energy storage available to charge and discharge at the power tendered to the National Grid at any given point in time. Depending on the State of Charge (SoC) management technique used, additional energy storage of 15-30 minutes is also needed to perform the actual frequency regulation activity. The results of this requirement are illustrated in FIG. 1. This Figure illustrates the capacity of an exemplary battery to store charge 10. In making effective use of a battery to supply and withdraw power, there is an optimal SoC range 12 for operation. That is, the amount of charge stored within a battery should, so far as possible, remain within defined upper and lower limits at all points in time. Ideally, the anticipated balancing function provided by this battery can be fulfilled by operation within this optimal SoC range 12. FFR requirements however dictate that the battery must, at any point in time, have an additional 30 minutes available to withdraw power from the grid. This translates as an additional storage capacity 14, shown above the optimal SoC operational range 12 in FIG. 1. A battery used in FFR applications must also have the ability to supply power to the grid for an additional 30 minutes at any point in its operation. As a consequence, the battery SoC must always be maintained above a level 16 that permits 30 minutes of power to be supplied.

As can be seen in the Figure, this results in a battery system with an oversized and mostly unused energy storage component. This is a problem because, although the battery has many advantages to being used in balancing services, its cost is primarily driven by the size of energy storage provided. Grid requirements are therefore costly to meet and so hinder the take up of battery storage components in a balancing system providing FFR.

To date, prior art grid balancing systems that make use of batteries have focused on the performance of the battery itself. For example, US 2016/0099568, referenced above, is concerned with optimising the performance of the battery as it provides frequency balancing. This is achieved by building in various safeguards to the system, such as a Power Absorbing Load, which together ensure battery operation is within the optimal SoC range and that charging rate is below a level at which damage to the battery becomes likely. Operation above the optimal SoC increases the rate at which the battery deteriorates as a result of charging and discharging; operation below reduces the power available to the extent that the battery will not be able to carry out its intended function.

There is a perceived need for an alternative system that is suitable for providing FFR response that exploits the response speed of batteries but without the costs implicit in the battery-enabled systems of the prior art.

The present invention accordingly provides a method of balancing an electrical power distribution network, the method comprising:
(a) Monitoring a level of charge (SoC), either directly or indirectly via a parameter that is a function of the SoC, stored in a storage battery connected to the network that, on charging, is adapted to withdraw power from the network and, on discharging, is adapted to add power to the network,
(b) Responding to imbalances detected in the network by adding power to or withdrawing power from the network in accordance with the following:
  (i) If the battery SoC is within an optimal range, charging and discharging the battery to counteract imbalances in the network;
  (ii) If the battery SoC falls below a low threshold, selecting an alternative asset (low) that is adapted to increase power supplied to the network relative to that withdrawn from it and, in response to a critical low signal, switching on the alternative asset (low) such that it provides a balancing service to the network; and
  (iii) If the battery SoC rises above a high threshold, selecting an alternative asset (high) that is adapted to withdraw power from the network relative to that supplied to it and, in response to a critical high signal, switching on the alternative asset (high) such that it provides a balancing service to the network;
wherein the low threshold is determined such that after generation of the critical low signal, the battery remains capable of discharging for a lag time equivalent to a time taken for the selected asset (low) to reach its operational capacity; and
the high threshold is determined such that after generation of the critical high signal, the battery remains capable of charging for a lag time equivalent to a time taken for the selected asset (high) to reach its operational capacity.

In a second aspect, the present invention provides a system for providing balancing services to an electrical power distribution network to which it is connected, the system comprising:

a storage battery with a detector adapted to monitor, either directly or indirectly, its state of charge (SoC);

at least one non-battery asset (low) that is adapted to increase power supplied to the network relative to that withdrawn from it;

at least one non-battery asset (high) that is adapted to increase power withdrawn from the network relative to that supplied to it; and a central controller adapted to be responsive to imbalances detected in the network, to receive information from the SoC detector and to generate signals for controlling operation of the battery and the assets; characterised in that the central controller is further arranged to respond to imbalances as follows:

(a) By charging and discharging the battery to counter the imbalances when information received from the SoC detector indicates that the battery SoC is within an optimal range, the optimal range extending between a predetermined low threshold and a predetermined high threshold;

(b) By operating asset (low) to increase power supplied to the network relative to that withdrawn from it when information received from the SoC detector indicates that the battery SoC is below the predetermined low threshold; and (c) By operating asset (high) to increase power withdrawn from the network relative to that supplied to it when information received from the SoC detector indicates that the battery SoC is above the predetermined high threshold;

Wherein the low and high thresholds are determined such that:

with SoC at the low threshold, the battery remains capable of discharging for a lag time equivalent to a time taken for the selected asset (low) to reach its operational capacity; and with SoC at the high threshold, the battery remains capable of charging for a lag time equivalent to a time taken for the selected asset (high) to reach its operational capacity.

With this present invention, a battery is primarily responsible for providing the response service to network imbalances. It is only when a more extreme response is required, for example sustained discharge into the network, that alternative, slower, assets are called on to provide rebalancing services. By providing a battery rebalancing service that is backed up by supplementary assets, regulatory requirements for a response system to retain a certain amount of power in reserve are met by the supplementary assets, leading to a reduction in capacity requirement for the battery. This reduces the cost of the battery, which is a significant hindrance to the uptake of batteries in rebalancing services.

In a third aspect, the present invention provides a method of selecting non-battery assets from a portfolio of non-battery assets to supplement balancing services to a network provided by a battery, the battery having a detector adapted to monitor, either directly or indirectly, its state of charge (SoC) and, if the detector indicates the battery SoC exceeds a high threshold or falls below a low threshold, method includes the steps of:
(a) Identifying a number of combinations of aggregated assets from the portfolio, wherein:
   (i) If the method is triggered by exceeding the high threshold, each asset is operable to provide a balancing response equivalent to withdrawal of power from the network;
   (ii) If the method is triggered by falling below the low threshold, each asset is operable to provide a balancing response equivalent to supply of power to the network; and
   (iii) Each combination includes at least one asset and has a respective lag time, this lag time being a time taken for the respective combination of aggregated assets to reach its operational capacity;
(b) For each of the combinations of aggregated assets identified, verifying that:
   (i) The combination is capable of operating at a power level sufficient to match that of the battery when carrying out its balancing service; and
   (ii) The battery threshold at which this method is triggered is such that the battery is capable of continuing either its charging or discharging balancing function without reaching either full capacity or full depletion for the lag time of the respective combination;
(c) For all verified combinations found at Step (b), identifying the lowest-cost combination, taking into account operational costs and those associated with asset degradation;
(d) Switching on the lowest-cost combination of aggregated assets identified and Step (c); and
(e) After a delay of the lag time associated with this lowest-cost combination, and if the battery SoC has not returned to a level between the low and high threshold values, switching off the balancing service provided by the battery.

The invention will now be described, by way of example only, and with reference to the accompanying drawings, in which.

Figure 2:
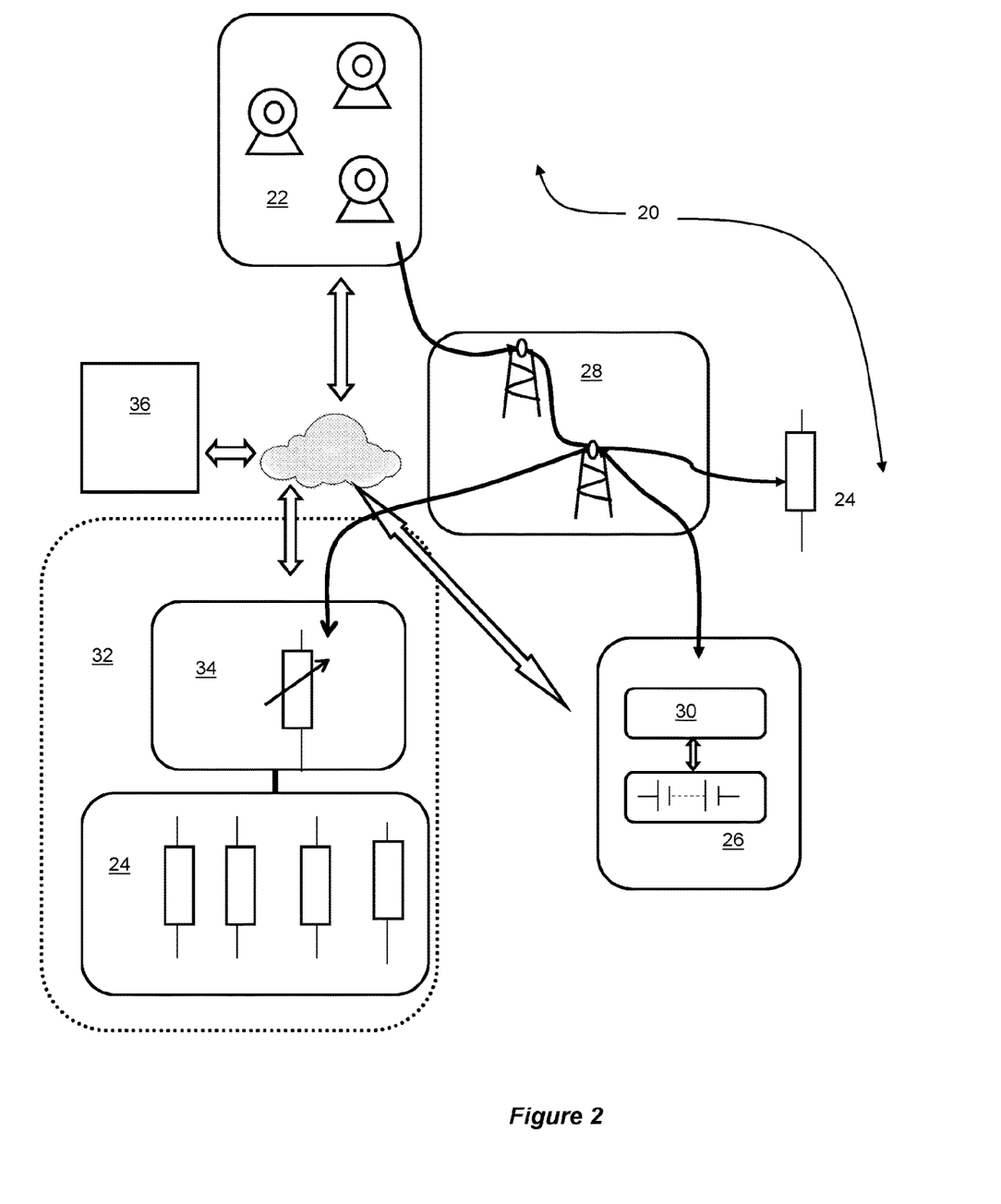
FIG. 2 shows an electricity supply system incorporating a battery, suitable for use with the present invention.

An electrical power supply system indicated generally by 20 is illustrated in FIG. 2. The electrical power supply system 20 comprises one or more power generators 22, a plurality of electrical loads 24 and a storage battery 26. The power generators 22 supply electrical energy to the electrical loads 24 via an electrical power distribution network 28 (hereinafter "the network 28").

In such a power distribution network 28, it is, as noted earlier, important to balance supply and demand. In essence, this involves monitoring the network 28 for variations in a particular characteristic of the network, for example supply frequency. The system 20 therefore also includes a frequency monitor 30 that is in communication with the battery 26. In this embodiment the frequency monitor 30 is located in the proximity of the battery 26, but this is not essential. Monitoring transitory fluctuations in frequency is the currently preferred approach to detecting imbalances in the power supply across the network 28 but alternative monitors 30 adapted to detect fluctuations in other characteristics of the electricity supply network 28, which are representative of imbalances in the power supplied across the network 28, are envisaged and may be substituted for the frequency monitor 30.

Although represented together in FIG. 2, the power generators 22 are not to be considered of the same type. Some may be coal power stations, others wind farms, hydroelectric generators, or any of a number of known systems that are capable of generating electricity and supplying it to a network. In general, each generator will have an arrangement with the network manager to supply a set amount of electricity to the network. This set amount may be adjusted in accordance with the contractual requirements of the generator in order to provide a degree of balancing to the grid. The speed at which this balancing response can be provided varies considerably between generator types. For example, diesel generators, wind farms and anaerobic digesters are relatively slow mechanisms with which to generate electricity. Generators based on hydroelectric mechanisms are faster and so are capable of more rapid balancing response.

Electrical loads 24 are still more varied in their nature. Generally, they draw power from the grid on demand and only a limited subset are capable of providing a response service to counter network imbalance. Those that are capable however may be adapted on an individual basis or as an aggregate of a plurality of loads that are operated collectively to provide a responsive load service, which adapts to assist in balancing network supply and demand, as is known in the art.

FIG. 2 illustrates an example 32 of a plurality of loads 24 that are collectively operated to provide a responsive service. Such electrical loads 24 may be connected to and in communication with a semi-autonomous load controller 34. The semi-autonomous load controller 34 is adapted to control the amount of electrical energy drawn by the electrical loads 24 from the network 28. Preferably, the semi-autonomous load controller 34 is physically close to and, optionally, integrated into the one or more electrical loads 24 with which the load controller 34 is connected so as to minimise communication latency between the load controller 34 and its respective one or more electrical loads 24. A plurality of electrical loads 24 may be controlled collectively as a group by a single load controller 34. In this instance, electrical load members of the group may be selected as part of a sub-group according to, for example, a common end user of the electrical loads 24 and/or similar electrical energy requirements, such as but not limited to similar duty cycles and/or differing but complementary electrical energy requirements. Like the generators however, each responsive load will vary in the speed with which it can respond to grid imbalances. Again, this depends primarily on the operational parameters of the load, but also on the manner in which loads may be grouped together to provide a responsive load service. Loads that are capable of providing a relatively fast response include compressors, commercial refrigerators and super-capacitors. Water pumps and waste-water treatment blowers are capable of slower balancing responses.

The battery 26 may be any of a number of devices that are adapted to store charge. It may therefore be an accumulator or an electrochemical or electromechanical storage device. The battery 26, although referred to herein in the singular, is more likely a bank of batteries, or any combination of electrical storage devices. In contrast with the other devices connected to the network 28, the battery 26 can both draw power from and supply it to the network.

As is common in the art, the battery 26 is equipped with a battery controller (not shown). The battery controller is adapted to infer the instantaneous State of charge (SoC) of the battery 26 from observation of the voltage at which it charges or discharges. That is, the battery controller provides an indication of the battery SoC for use by the network of which it is a part. In other embodiments, the SoC is derived from observation of a parameter that is a function of the battery SoC, for example the net energy input to the battery system.

In the system 20 in accordance with this invention, the method by which the network is balanced is governed by a central controller 36, which is, in general, located remotely from the generators 22, loads 24 and battery 26. The central controller 36 is in communication, for example via a virtual private network (VPN), with the frequency monitor 30, the generators 22 and loads 24 (or controllers 34 thereof).

Transmission system operators in Europe require stabilisation measures to commence as soon as the grid frequency deviates by more than 0.01 Hz from the target frequency of 50 Hz. In the system 20, the frequency of the grid is monitored by the frequency monitor 30. If the grid frequency rises to 50.01 Hz, this threshold is noted by the frequency monitor 30 and a signal sent to the battery 26 to increase its stored charge and so withdraw power from the grid. The battery 26 will increase its stored charge until grid frequency returns to 50 Hz, or until its contracted FFR or EFR response is complete. The minimum contractual requirement in the UK is currently the withdrawal of 1 MW power for 30 minutes. Similarly, if grid frequency falls to 49.99 Hz, the frequency monitor 30 sends a signal to the battery to reduce its stored charge and so input power to the grid. The battery will continue sending power into the network until the frequency rises again to 50 Hz or until its FFR/EFR contractual obligation is complete.

It will be appreciated that the battery 26 of this system is configured to provide FFR or EFR. That is, it is required to deliver a set power (for example 1 MW) quickly but only for a relatively short timescale (for example 30 minutes maximum). If, within this timescale, grid frequency has not returned to 50 Hz then other, slower, rebalancing mechanisms will take over.

Figure 3A:
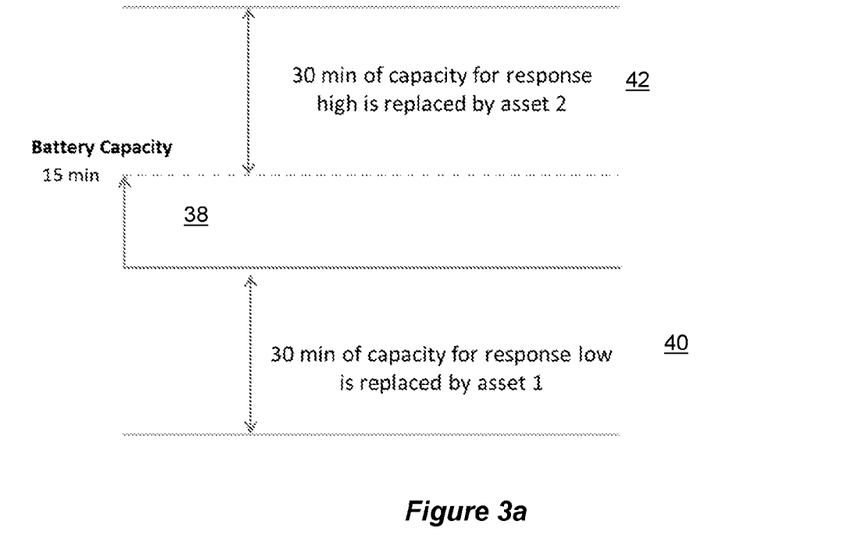
FIG. 3a is a representation of how other assets working in conjunction with the battery can be used to ensure availability of the additional 30 minutes worth of energy storage required by the National Grid from an FFR system.

In the system of the present invention 20 however, the battery 26 is not in itself capable of delivering the full FFR. Rather than using a battery with 30 minutes capacity both for high and low frequency excursions, the battery 26 of the present system utilises substantially its full capacity under normal operating conditions. FIG. 3a illustrates graphically the response capacity of the FFR/EFR system 20. The battery 26 has sufficient capacity 38 to provide or withdraw power over a total range of 15 minutes operation. The central controller 36 (see FIG. 2) is in communication with the battery controller, which provides an indication of the SoC charge of the battery 26. The central controller 36 is therefore able to determine, as the battery 26 is supplying power to the grid, if the grid frequency excursion is such that it drops below the nominal frequency for such time as the battery's capability to provide power approaches exhaustion. The controller 36, will, in this situation, send a signal to one or more generators 22 linked to the system to provide more power. Alternatively, the signal can be sent to one or more of the responsive loads 24 to reduce consumption. Either way, an alternative mechanism for providing power to the network 28 is implemented, generically termed "asset 1" in FIG. 3a. Asset 1, or the collection of assets that are capable of providing response low balancing, has sufficient capacity to provide the full 1 MW power for 30 mins 40, as required for FFR.

Similarly, if the grid frequency increases for a period beyond that for which the battery's capacity to store charge is exceeded, the controller 36 will signal one or more generators to go offline or, equivalently, one or more responsive loads to increase consumption. That is, "asset 2" covers the reserve response 42 required for balancing response high.

This composite system of battery 26 and assets 22, 24 allows FFR and EFR requirements to be fulfilled with a battery that need only supply 15 minutes of power, within a range that extends close to its maximum and minimum capacity. This permits use of smaller capacity, and therefore far less costly, batteries. How close the normal operating range will extend to maximum and minimum SoC limits will depend primarily on the particular characteristics on the battery in use. The normal operating range should be within the range of efficient battery operation, which is dependent on the specifics of battery charging and discharging mechanisms.

Figure 3B:
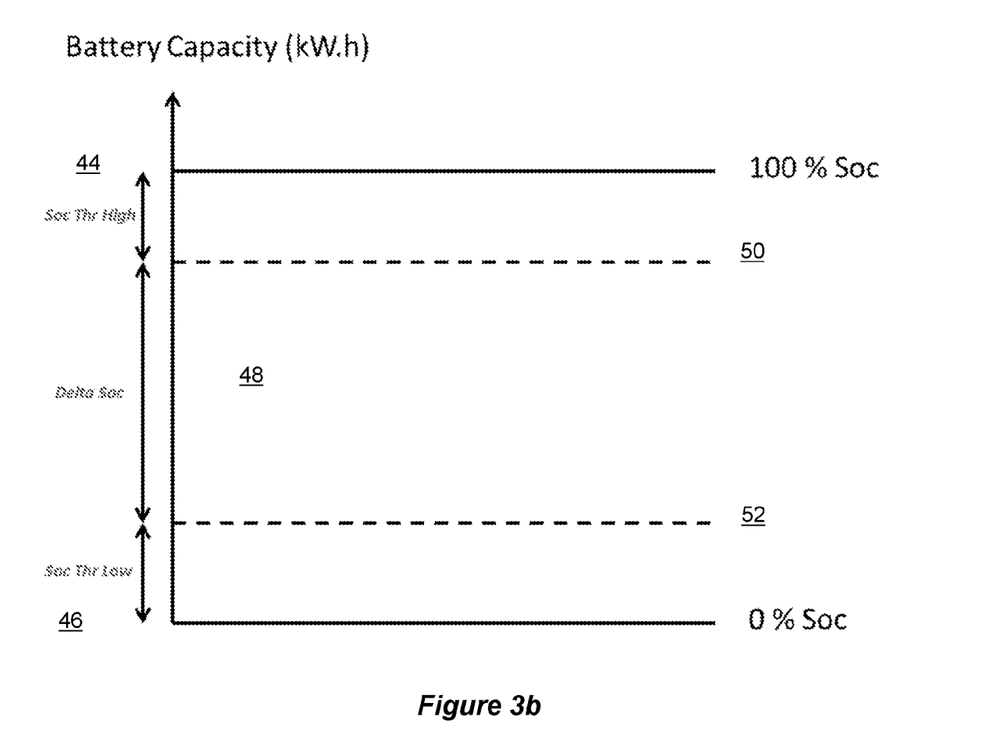
FIG. 3b is a representation of battery state of charge, showing threshold levels when these other assets are called online to provide a rebalancing service.

FIG. 3b illustrates how the system 20 is configured to respond to the battery 26 state of charge. When the battery 26 is fully charged, its SoC 44 is 100%; when fully depleted, its SoC is 0%. The battery 26 is required to operate within a band $\Delta$SoC 48, without any additional action being taken i.e. when fulfilling its FFR or EFR function without recourse to alternative balancing mechanisms. Within an upper SoC range SoC Thr High, extending from an upper threshold 50 of the normal operational band $\Delta$SoC 48 to 100% charged, the system 20 calls on other, slower, assets to provide FFR. Similarly, if the battery is depleted such that its SoC moves into a lower SoC range SoC Thr Low, extending from a lower threshold 52 of the normal operational band $\Delta$SoC 48 to battery depletion at 0% SoC, the system 20 calls on alternative assets to provide FFR.

The operating criteria that must be met by the battery can be derived by ensuring it can supply/withdraw sufficient charge before the relevant asset (1 or 2) can come online. Consider the situation in which Asset Low, for example a diesel generator, is available to provide the reserve response to the battery 26 in FFR operation. Asset Low is only able to switch on in a time period Lag Time Low after it receives a signal from the controller 36 to come online. Once on, commercial considerations dictate that the asset must remain on and provide a power Power Asset Low for at least a minimum time period Duration Low. That is, it is not economically worth the cost of switching on the asset unless it supplies a certain amount of energy. Once on, the asset is capable of operating to supply Power Asset Low indefinitely.

The battery itself cannot be 100% efficient in its conversion of stored charge to power supplied to the network nor in its extraction of power from the network to increase its stored charge. That is, it operates at an efficiency in charging of Battery Efficiency in Charging and in discharging at Battery Efficiency in Discharging, where both efficiency variables are between 0 and 100%.

The battery must always have sufficient energy ($E_B$ (low)) to discharge at a rate of Power Asset Low for a time period Lag Time Low such that it covers the time taken to switch on Asset Low. That is:

$$E_B(\text{low}) \geq \text{Lag Time Low} \times \frac{\text{Power Asset Low}}{\text{Battery Efficiency in Discharging}}$$

The lower threshold 52 of the battery 26 is therefore set such that the range SoC Thr Low is equivalent to this quantity $E_B$ (low) of stored energy.

Similarly, if Asset High is represented by a power consuming device such as a loadbank, it is assumed that this will switch on in a time period Lag Time High after it receives a signal from the controller to come online. Once on, commercial considerations dictate that the asset must remain on and provide a power Power Asset High for at least a minimum time period Duration High.

The SoC high threshold 50 of the battery 26 is therefore set such that the range SoC Thr High includes sufficient battery storage capacity ($E_B$ (high)) to cover the time taken to switch on Asset High. That is:

$$E_B(\text{high}) \geq \text{Lag Time High} \times \frac{\text{Power Asset High}}{\text{Battery Efficiency in Charging}}$$

In other words, the range SoC Thr High extends from the SoC high threshold 50 to 100% SoC, covering sufficient storage capacity for battery energy $E_B$ (high).

It is noted that once on, both asset 1 and asset 2 must stay on for a minimum duration. In the case of under-generation and Asset Low being a diesel generator, this means that the minimum energy that must be input to the grid by Asset Low is:

Power Asset Low×Duration Low.

In the worst case, the asset turns on immediately, as soon as it is called (with no time lag) and, at the same time, the FFR response is required to cease immediately. For example, there is a rapid increase in grid frequency from below to above 50 Hz. In this situation, the battery must have enough capacity (while at SoC thr low) to increase its SoC to compensate for the additional energy being provided by the asset that the FFR response dictates is no longer required. That is the battery capacity ΔSoC must satisfy:

$$\Delta(SoC) + E_B(\text{high}) \geq \text{Duration Low} \times \frac{\text{Power Asset Low}}{\text{Battery Efficiency in Charging}}$$

Similarly, in order to compensate in the situation in which asset 2 is called on and, at the same time, grid frequency recovers such that FFR response is no longer needed:

$$\Delta(SoC) + E_B(\text{low}) \geq \text{Duration High} \times \frac{\text{Power Asset High}}{\text{Battery Efficiency in Discharging}}$$

Total battery capacity $Cap_B$ is therefore determined from:

$E_B(\text{low}) + \Delta SoC + E_B(\text{high})$.

That is:

$$Cap_B = \max\left\{\left(\text{Lag Time Low} \times \frac{\text{Power Asset Low}}{\text{Battery Efficiency in Discharging}} + \text{Duration Low} \times \frac{\text{Power Asset Low}}{\text{Battery Efficiency in Charging}}\right);\right.$$
$$\left.\left(\text{Lag Time High} \times \frac{\text{Power Asset High}}{\text{Battery Efficiency in Charging}} + \text{Duration High} \times \frac{\text{Power Asset High}}{\text{Battery Efficiency in Discharging}}\right)\right\}$$

EXAMPLE

A diesel generator takes 2 minutes to switch on and thereafter provides a power of 1 MW for a minimum of 3 minutes.

The battery provides 1 MW power at an efficiency of 90% at both high and low SoC.

The lower SoC threshold 52 of the battery 26 must therefore be set such that the range SoC Thr Low ($E_B$(low)) is a minimum of $2/60 \times (1000/0.9) = 37$ kW·h. That is, it must be able to provide its 1 MW of power at 90% efficiency for the 2 minutes it takes the diesel generator to switch on. The minimum amount that it needs to be able to charge (ΔSoC+ $E_B$(high)) in the event that the generator comes on line and then is no longer required is $3/60 \times (1000/0.9) = 56$ kW·h.

A loadbank takes 1 minute to switch on and thereafter withdraws a power of 1 MW for a minimum of 1 minute. The higher SoC threshold 50 must therefore be set such that the range SoC Thr High ($E_B$(high)) is a minimum of $1/60 \times (1000/0.9) = 19$ kW·h. The minimum charge that it needs to keep available for discharge (ΔSoC+$E_B$(low)) in the event that the loadbank comes on line and then is no longer required is also $1/60 \times (1000/0.9) = 19$ kW·h.

In this example, the diesel generator is the one that requires most compensation and so dictates the capacity of the battery. The total capacity is therefore a minimum of 93 kW·h: 37 kW·h to "fill in" for the generator lag and 56 kW·h to compensate in the event that FFR is no longer required. Of these 56 kW·h, 19 kW·h ($E_B$(high)) are required to "fill in" for the loadbank lag and ΔSoC is 37 kW·h.

These values represent minimum parameters for the battery to provide effective FFR/EFR in conjunction with the specific generator and loadbank. That is, the normal operating range must extend at least 37 kW·h and there must, at any point when operating within this range without any assistance from other assets, be a reserve of 19 kW·h above the upper threshold 50 and of 37 kW·h below the lower threshold 52.

This dramatically reduces battery capacity in comparison with prior art batteries used to provide FFR response. National Grid requirements for FFR provided by a battery alone result in upper and lower reserves of around 500 kW·h.

The present invention relates to a power distribution system 20 in which multiple assets, such as generators 22 and loads 24, are aggregated to provide reserve cover for a battery energy storage system 26 in the provision of a firm frequency response to imbalances in the network.

Potentially, this provides many advantages. First and foremost, the overall capacity of the battery 26 used to provide FFR is reduced. This represents a significant reduction in capital costs. Secondly, the battery 26 throughput is reduced as another asset fills in for part of the work previously carried out by the battery alone. This slows the degradation of the battery, which results in increased battery lifetime. In addition, a system in accordance with the present invention employs a battery in the provision of an FFR service, without the need for current SoC management techniques such as rebalancing within the deadband or biasing the response of the portfolio.

There are many considerations that must be taken into account in operating a system in accordance with this invention. These include both physical and commercial constraints. Examples of the former include the length of time an asset takes to switch, the power that it can provide and whether such power can be varied. Commercial constraints include the duration for which the asset must remain switched on to be cost effective and the cost of calling that asset online. In the embodiment of the system shown in FIG. 2, the controller 36 includes a processor that is programmed to run an algorithm that balances the operating condition of the network with the state of charge of the battery and the cost and available performance of the assets that are available to provide cover at any particular point in time. If circumstances dictate that a particular asset is to be switched on, the controller 36 sends a signal to that asset 22, 24, instructing it to provide a balancing response. The signal may indicate that the asset 22, 24 is to be operational for a set period only, for example its minimum contractual duration, or to remain on until the controller 36 is notified of a return of the network to a particular operating condition, for example the battery SoC returns to a particular level.

Figure 4A:
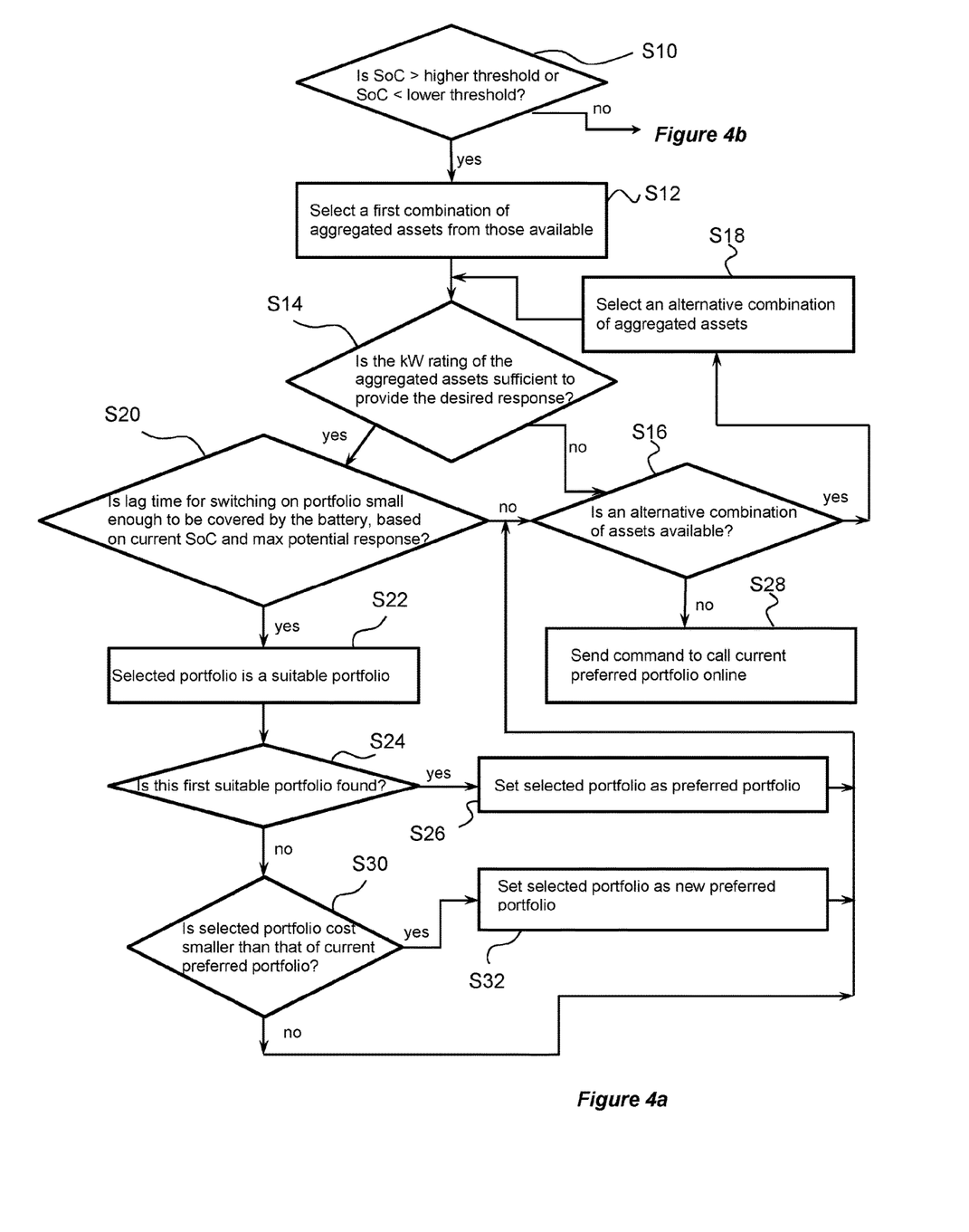
FIGS. 4a and 4b illustrate a flow chart of the process steps involved in providing a battery-based FFR service to a power distribution grid, in accordance with the present invention.
Figure 4B:
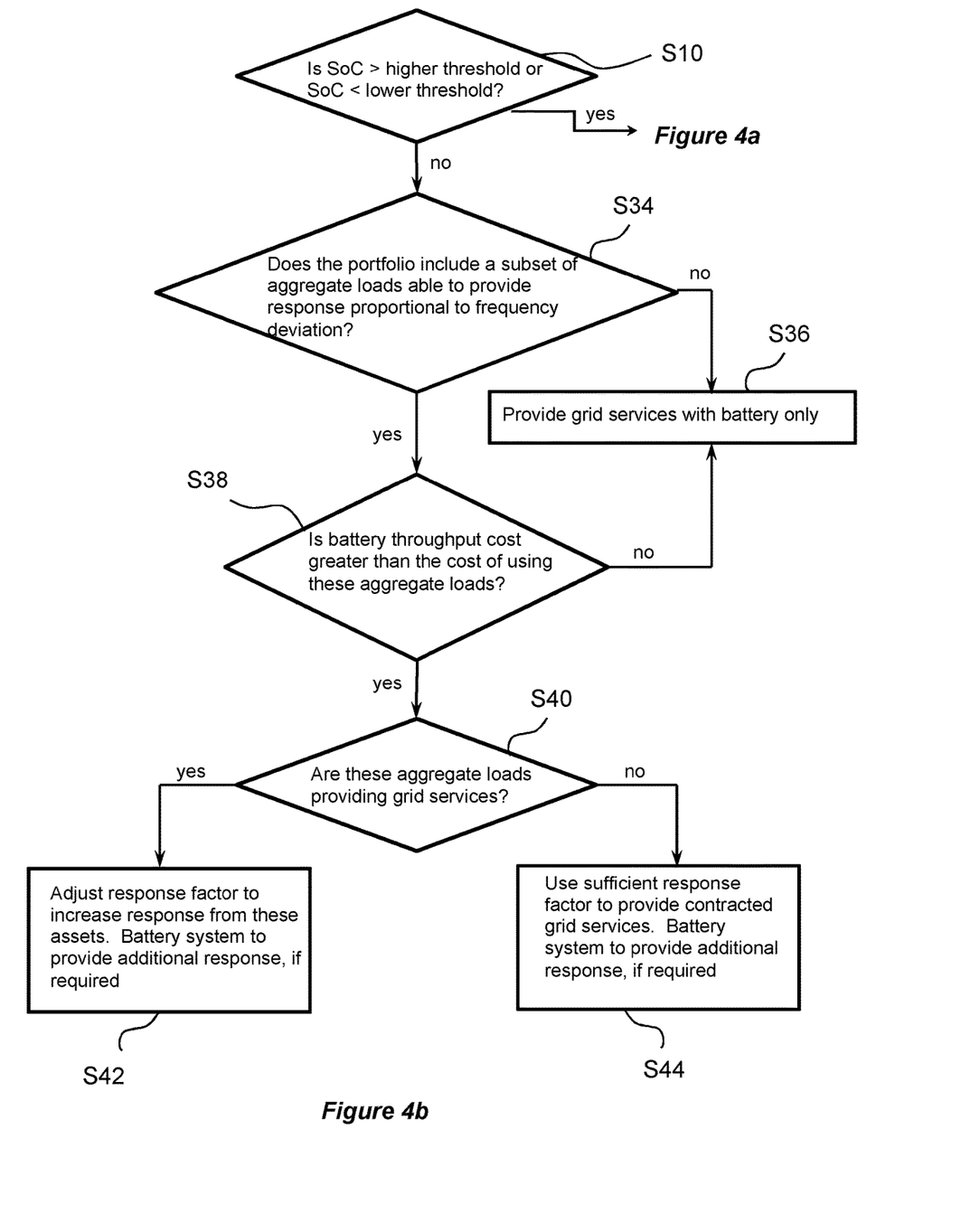

A flow chart illustrating an example of an algorithm that runs within the controller 36 to enable management of the system 20 to provide FFR is shown in FIGS. 4a and 4b.

In implementing the system of the current invention, the battery SoC is monitored with 1 second resolution. At a first step S10 of a method of providing FFR or EFR in accordance with this invention, the current SoC of the battery is checked to see if it is within normal operating range (ΔSoC) or outside of this, either above the higher threshold 50 and so in the SoC Thr High range or below the lower threshold 52 and in SoC Thr Low range. If it is within the normal range ΔSoC, the battery 26 is providing network services in a "normal operation mode". The battery SoC is within acceptable boundaries and no emergency SoC correction measures need be taken. This mode will be described later with reference to FIG. 4b. If the battery SoC is above the high threshold 50 or below the low threshold 52, the system 20 will enter "critical operation mode" and SoC rebalancing is required. This mode will now be described with reference to FIG. 4A.

At a next step S12, one or more of the assets that are available to provide the appropriate response are selected. Reference is made herein to an aggregated set of assets that are adjusted together to provide the desired response. An aggregation of assets is particularly appropriate when the response is provided by a subset of loads that are able to provide a dynamic increase or decrease in their power consumption that is in proportion to frequency deviation. Responsive loads such as this are particularly attractive in that they can be responsive to both high and low frequency excursions (and SoC variations). A reduction in load demand is equivalent to additional power generation and reference to one scenario is understood to encompass the other. It is further to be understood that reference to an aggregation of assets or to an aggregated portfolio reflects only the fact that this is the preferred arrangement. That is, use of a single asset, generator or load, to provide SoC rebalancing is not excluded and indeed may be preferred in certain circumstances.

The first combination of assets (which, specifically, may comprise a single asset) is analysed at Step S14 to see if the size (in kW) of the load that may be brought into or removed from the system 20 is sufficient to provide the desired response. That is, would it not only have sufficient power to take over from the balancing role currently provided by the battery 26, but also is the aggregate available to charge/discharge an adequate amount of power in order to make sure that the system 20 provides a response that is in line with the service contracted to the network operator. That is, to supply a set maximum power for a specified maximum duration. If the selected portfolio has insufficient power, this combination is considered no further. The method then, at Step S16, checks to see if an alternative combination of aggregated assets is available. If it is, then this alternative is selected at Step S18 and the power assessment step S14 is repeated with respect to this alternative combination. If the combination under consideration does provide sufficient power required for a response, the process proceeds to make a check at Step S20 of the lag time necessary for this selected combination of assets. That is, the time delay inherent to the asset between it receiving a signal command to vary consumption or to come online and it being in a position to provide an active response service to the network. At this step S20, the lag time to switch on the selected combination is checked against the SoC of the battery. The lag time must be small enough that while the asset is being brought online, the battery has sufficient capacity to continue providing the balancing service, even if this should be required at its maximum potential response. If the time lag is too long, this combination of assets cannot be used and, if another is available, the method returns to the first check step S14 with another combination of assets S18.

If the lag time is acceptable, then the selected portfolio is, at Step S22 deemed a suitable portfolio for providing the response. At Step 24, a check is carried out as to whether previous suitable portfolios have been found. If not, then the current portfolio is set S26 as the preferred portfolio. The method then returns to Step S16 to select another combination of assets in order to test their suitability to provide a response. If no further combinations are available, then the assets within the current preferred portfolio are called S28 online to provide a response.

Alternatively, if the currently selected portfolio is determined at Step S24 not to be the first to satisfy the essential criteria, the method proceeds to check commercial considerations. At Step S30 therefore, the cost of activating the currently selected portfolio to provide a response is compared with that of the previously-selected preferred portfolio. In determining costs a number of factors are taken into account. These include not only operational costs such as that of fuel to power a diesel generator, and electricity to power a loadbank or a slow load, but also marginal costs associated with switching on demand as opposed to scheduled operational times and those arising through additional degradation and wear and tear of the asset.

If the current aggregate of assets would be more cost effective that the previously-preferred portfolio, then it takes over S32 and the new preferred portfolio. Otherwise, the previously-preferred selection is retained. In either case, the process then returns to Step S16 to check if another combination of assets is available for selection.

In this way, all possible options for bringing a selection of assets from all those available to the system are checked for their ability to meet technical requirements. From those that meet the requirements, the selection that is least costly is implemented S28.

After sending S28 the command to call the current preferred portfolio online, the battery 26 will continue its charging or discharging into the network for the period that it takes to bring the selected asset portfolio online. That is, for lag time low or lag time high, depending on the FFR response being implemented. It is only after this time that the battery stops providing FFR services. It is then free to charge or discharge, as required, to bring its SoC to within its normal operating range ΔSoC.

In many situations, the asset that is activated to provide the reserve to the battery FFR will be of a type that is either on or off. That is, it either contributes a set amount of power to, or withdraws it from, the network. It cannot provide the fine tracking of frequency deviation of which the battery 26 is capable. Under these circumstances therefore, the battery SoC is monitored after the asset is activated. As soon as it returns within its normal operating range ΔSoC, the battery 26 will provide a response in conjunction with the reserve asset in order to provide fine adjustments in power supplied to/withdrawn from the network enabling the system to more closely follow frequency deviations. This situation of combined FFR response will persist for such period (Duration high or Duration low) that corresponds with the minimum operating time of the asset, before it can be taken offline and full FFR response returned to the battery. This process of operating a battery in combination with a less-responsive asset is described in US 2016/0099568.

The activated asset will not, in general, come online instantaneously and there will be some ramping up period in which, in the case of a generator for example, it will be supplying an increasing amount of power to the network until it reaches full capacity. This will particularly be the case for a portfolio of assets in which each asset will likely have a different start up time. In the embodiment of the invention described above, the battery 26 remains operating at its full power as it discharges to the network to cover the time taken for the generator to become fully operational. That is, throughout the period lag time low after the battery SoC reaches its low SoC threshold 52. In alternative embodiments, the asset power output during this ramping up phase is monitored and communicated to the central controller 36. The central controller 36 then adjusts the operating power of the battery 26, such that the battery discharge power is reduced in line with the increase provided by the generator. In this way, the total output power from battery and asset will remain constant.

Many assets connected to the network will have a well defined start-up sequence that results in a known pattern of power increase during the ramping up phase. For these assets therefore, there is no need to monitor the power output. Instead, the central controller 36 will have access to stored sets of voltages at which the battery should be operated, each set corresponding to a respective portfolio of available assets. By operating the battery at the voltages contained within the relevant set, battery output power decreases in a pattern that mirrors the increase in power output as the selected portfolio of assets comes online. That is, the overall power output remains constant over the start up period.

The advantage of these embodiments is that the battery does not need to ensure sufficient surplus capacity to cover the lag time of the assets at full discharging/charging power, but at reduced power levels. This reduces the volume of underused SoC capacity that is required to be available in the battery, as well as enabling improved FFR tracking during asset start-up by the system.

Returning now to Step S10, if it is determined that the battery SoC is within acceptable boundaries, the method proceeds to the "normal operation mode". If the non-battery assets are of a type that are either on or off and have no facility to adjust their response level in accordance with deviation from the nominal frequency of the network, then, in this mode, frequency response will be provided solely by the battery. Frequency deviations will be followed closely, with the battery either charging or discharging, as appropriate.

In the event however that the aggregated portfolio includes responsive loads (32, FIG. 2), the normal operating mode may be modified in accordance with technical and economic considerations similar to those described in relation to the critical operation mode. A responsive load 32 is one that is able to provide a dynamic response and adjust the power it supplies to or withdraws from the network in accordance with the extent of network frequency deviation. It may therefore be more economical to use these assets to provide ancillary services to the battery 26 in normal operation mode. This is illustrated in FIG. 4b.

In normal operation mode therefore, an initial step S34 is to determine whether any responsive load devices are available to the system to provide reserve services to the battery. If there are none, the battery only is capable of tracking frequency variations and FFR grid services are therefore provided S36 by the battery alone. If such responsive load assets are available, the process moves to Step S38 at which the cost of using the battery is compared with the cost of using the aggregated loads. This cost to the aggregated load is assessed under similar criteria to those of the assets brought online in "critical operation mode". Battery throughput may be used as an indicator of cost in terms of battery degradation: it is known that batteries deteriorate with constant charging and discharging. In addition, there are inherent losses in the battery system in carrying out FFR balancing due to a less than 100% efficiency. This also makes a contribution to cost.

If use of the aggregated assets proves more costly than using the battery for FFR, the process reverts to Step S36 and service is provided by the battery only. If the aggregated loads prove cheaper, a final assessment S40 is made as to whether the selected loads are already providing network services. If they are, their response is increased S42 accordingly. If not, they are brought online S44 to provide a service to the extent required by contract. In both cases, the faster response time of the battery is used to supplement the response provided by the loads in order to better track frequency variations.

Multiple simulations have been run to demonstrate the effectiveness of providing FFR using a battery system backed up with multiple assets within a portfolio of loads. These are compared with prior art systems that use battery power for FFR with deadband rebalancing. For a battery supplying 1 MW power, simulations show the following results:

The capacity of the battery was reduced to 250 kW·h without impacting the service provided to the grid;

Slow loads were successfully used to implement SoC management of the battery, the battery SoC being always kept within desired boundaries, without the need for alternative SoC management techniques such as deadband rebalancing;

Throughput of the battery may be decreased by relying more heavily on backup assets, especially those that are themselves capable of following frequency deviations; and Taking grid data from January 2015, it was found that while the system of the present invention could be used to keep SoC of a 1 MW/2 MW·h battery within the narrow boundaries of ±125 kW·h, 22% of values fell outside this interval when using deadband rebalancing.

The invention claimed is:

1. A method of balancing an electrical power distribution network, the method comprising:
   (a) Monitoring a level of charge (SoC), either directly or indirectly via a parameter that is a function of the SoC, stored in a storage battery connected to the network that, on charging, is adapted to withdraw power from the network and, on discharging, is adapted to add power to the network,
   (b) Responding to imbalances detected in the network by adding power to or withdrawing power from the network in accordance with the following:
      (i) If the battery SoC is within an optimal range, charging and discharging the battery to counteract imbalances in the network;
      (ii) If the battery SoC falls below a low threshold, selecting an alternative asset (low) that is adapted to increase power supplied to the network relative to that withdrawn from it and, in response to a critical low signal, switching on the alternative asset (low) such that it provides a balancing service to the network; and
      (iii) If the battery SoC rises above a high threshold, selecting an alternative asset (high) that is adapted to withdraw power from the network relative to that supplied to it and, in response to a critical high signal, switching on the alternative asset (high) such that it provides a balancing service to the network;
   wherein the low threshold is determined such that after generation of the critical low signal, the battery remains capable of discharging for a lag time equivalent to a time taken for the selected asset (low) to reach its operational capacity; and
   the high threshold is determined such that after generation of the critical high signal, the battery remains capable of charging for a lag time equivalent to a time taken for the selected asset (high) to reach its operational capacity.

2. The method as claimed in claim 1 wherein the alternative asset (low) has a first minimum operational time and the alternative asset (high) has a second minimum operational time, these being times for which the respective asset should remain operational after switching on and wherein the optimal range for battery-regulated balancing is determined such that:
   after generation of the critical low signal, the battery has capacity to be charged for the first minimum operational time and at a power equivalent to the relative increase in power supplied to the network that results from operation of the alternative asset (low); and
   after generation of the critical high signal, the battery has capacity to be discharged for the second minimum operational time and at a power equivalent to the relative reduction in power supplied to the network that results from operation of the alternative asset (high).

3. The method as claimed in claim 2, wherein in the event that:
   asset (low) is providing balancing services to the network and time elapsed since generation of the critical low signal is less than the first minimum operational time; or
   asset (high) is providing balancing services to the network and time elapsed since generation of the critical high signal is less than the second minimum operational time; then
   if the battery SoC returns to the optimal range, the battery is charged or discharged as required to provide additional balancing services to the network.

4. The method as claimed in claim 1, wherein the low threshold is determined such that the battery remains capable of discharging throughout the lag time at its maximum contracted power.

5. The method as claimed in claim 1, wherein the high threshold is determined such that the battery remains capable of charging throughout the lag time at its maximum contracted power.

6. The method as claimed in claim 1, wherein at Step (b)(ii) of claim 1, the battery continues to counteract imbalances in the network for a period of time equivalent to the lag time associated with the selected asset (low).

7. The method as claimed in claim 6 wherein the battery discharges during the lag time at its maximum contracted power.

8. The method as claimed in claim 6 wherein the battery discharges at a varying power level during the lag time such that the effect of the selected asset (low) on network balance plus that of the battery is equivalent to that of the battery discharging at its maximum contracted power.

9. The method as claimed in claim 1, wherein at Step (b)(iii) of claim 1, the battery continues to counteract imbalances in the network for a period of time equivalent to the lag time associated with the selected asset (high).

10. The method as claimed in claim 9 wherein the battery charges during the lag time at its maximum contracted power.

11. The method as claimed in claim 9 wherein the battery charges at a varying power level during the lag time such that the effect of the selected asset (high) on network balance plus that of the battery is equivalent to that of the battery charging at its maximum contracted power.

12. The method as claimed in claim 1, the method also including the step of monitoring a parameter of the network, the parameter having a nominal operating value, fluctuations from said nominal operating value being indicative of the imbalances in the network to which the method is responsive in Step (b).

13. The method as claimed in claim 12 in which the monitored parameter is network frequency.

14. The method as claimed in claim 1, in which the selected asset (low) comprises an aggregated set of assets, each of which contributes to the overall capability of the aggregated set to increase power supplied to the network relative to that withdrawn from it.

15. The method as claimed in claim 1, wherein the step of selecting an alternative asset (low) at Step (b)(ii) includes the step of selecting at least one asset (low) from a portfolio of assets (low), each of said assets (low) within the portfolio first having an respective lag time and secondly being adapted to increase power supplied to the network relative to that withdrawn from it.

16. The method as claimed in claim 15 wherein the low threshold is determined such that the battery remains capable of discharging throughout the longest of the respective lag times of the assets (low) within the portfolio (low).

17. The method as claimed in claim 1, in which the selected asset (high) comprises an aggregated set of assets, each of which contributes to the overall capability of the aggregated set to reduce power supplied to the network relative to that withdrawn from it.

18. The method as claimed in claim 1, wherein the step of selecting an alternative asset (high) at Step (b)(iii) includes the step of selecting at least one asset (high) from a portfolio of assets (high), each of said assets (high) within the portfolio first having an respective lag time and secondly being adapted to reduce power supplied to the network relative to that withdrawn from it.

19. The method as claimed in claim 18 wherein the high threshold is determined such that the battery remains capable of charging throughout the longest of the respective lag times of the assets (high) within the portfolio (high).

20. The method as claimed in claim 1, wherein in the event that either asset (high) or asset (low) are providing the balancing service to the network, the method includes the additional step of charging or discharging the battery for such time as required to bring its SoC to within the optimal range.

21. A system for providing balancing services to an electrical power distribution network to which it is connected, the system comprising:
a storage battery with a detector adapted to monitor, either directly or indirectly, its state of charge (SoC);
at least one non-battery asset (low) that is adapted to increase power supplied to the network relative to that withdrawn from it;
at least one non-battery asset (high) that is adapted to increase power withdrawn from the network relative to that supplied to it; and
a central controller adapted to be responsive to imbalances detected in the network, to receive information from the SoC detector and to generate signals for controlling operation of the battery and the assets;
wherein the central controller is further arranged to respond to imbalances as follows:
(a) By charging and discharging the battery to counter the imbalances when information received from the SoC detector indicates that the battery SoC is within an optimal range, the optimal range extending between a predetermined low threshold and a predetermined high threshold;
(b) By operating asset (low) to increase power supplied to the network relative to that withdrawn from it when information received from the SoC detector indicates that the battery SoC is below the predetermined low threshold; and
(c) By operating asset (high) to increase power withdrawn from the network relative to that supplied to it when information received from the SoC detector indicates that the battery SoC is above the predetermined high threshold;

Wherein the low and high thresholds are determined such that:
with SoC at the low threshold, the battery remains capable of discharging for a lag time equivalent to a time taken for the selected asset (low) to reach its operational capacity; and
with SoC at the high threshold, the battery remains capable of charging for a lag time equivalent to a time taken for the selected asset (high) to reach its operational capacity.

22. A method of selecting non-battery assets from a portfolio of non-battery assets to supplement balancing services to a network provided by a battery, the battery having a detector adapted to monitor, either directly or indirectly, its state of charge (SoC) and, if the detector indicates the battery SoC exceeds a high threshold or falls below a low threshold, the method includes the steps of:
(a) Identifying a number of combinations of aggregated assets from the portfolio, wherein:
(i) If the method is triggered by exceeding the high threshold, each asset is operable to provide a balancing response equivalent to withdrawal of power from the network;
(ii) If the method is triggered by falling below the low threshold, each asset is operable to provide a balancing response equivalent to supply of power to the network; and
(iii) Each combination includes at least one asset and has a respective lag time, this lag time being a time taken for the respective combination of aggregated assets to reach its operational capacity;
(b) For each of the combinations of aggregated assets identified, verifying that:
(i) The combination is capable of operating at a power level sufficient to match that of the battery when carrying out its balancing service; and
(ii) The battery threshold at which this method is triggered is such that the battery is capable of continuing either its charging or discharging balancing function without reaching either full capacity or full depletion for the lag time of the respective combination;
(c) For all verified combinations found at Step (b), identifying the lowest-cost combination, taking into account operational costs and those associated with asset degradation;
(d) Switching on the lowest-cost combination of aggregated assets identified and Step (c); and
(e) After a delay of the lag time associated with this lowest-cost combination, and if the battery SoC has not returned to a level between the low and high threshold values, switching off the balancing service provided by the battery.

* * * * *